(12) United States Patent
Ma et al.

(10) Patent No.: US 8,152,369 B2
(45) Date of Patent: Apr. 10, 2012

(54) METHOD AND APPARATUS FOR DETERMINING TEMPERATURE IN A GAS FEEDSTREAM

(75) Inventors: Qi Ma, Farmington Hills, MI (US); Julian R. Verdejo, Farmington, MI (US); Nicholas John Kalweit, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 12/909,926

(22) Filed: Oct. 22, 2010

(65) Prior Publication Data

US 2011/0038394 A1 Feb. 17, 2011

Related U.S. Application Data

(62) Division of application No. 11/853,074, filed on Sep. 11, 2007, now Pat. No. 7,841,769.

(51) Int. Cl.
*G01K 7/14* (2006.01)
*G01K 7/16* (2006.01)
*G01K 13/02* (2006.01)
*G01K 1/16* (2006.01)
*G01N 23/12* (2006.01)

(52) U.S. Cl. ............ 374/147; 374/148; 374/164; 374/5; 374/135; 374/208; 701/108; 703/2

(58) Field of Classification Search ............ 374/29, 374/30, 43–45, 39–40, 137, 141–144, 147, 374/163, 183, 166, 167, 4, 5, 57, 27, 208, 374/185, 148, 135; 60/277, 272, 238; 73/23.25, 73/23.26, 25.03, 25.01, 31.05, 114.69, 114.71, 73/114.72, 114.73, 114.42, 114.34, 861.04, 73/204.11; 204/401; 123/697, 679, 676; 702/183; 703/2; 701/108

See application file for complete search history.

(56) References Cited

U.S. PATENT DOCUMENTS

| | | | |
|---|---|---|---|
| 4,683,858 A * | 8/1987 | Sato et al. | 123/486 |
| 6,594,620 B1 * | 7/2003 | Qin et al. | 702/185 |
| 6,619,261 B1 | 9/2003 | Wang et al. | |
| 6,679,238 B2 | 1/2004 | Nebiyeloul-Kifle et al. | |
| 6,823,839 B2 | 11/2004 | Yasui et al. | |
| 6,866,024 B2 * | 3/2005 | Rizzoni et al. | 123/430 |
| 7,036,351 B2 | 5/2006 | Smith | |
| 7,036,982 B2 * | 5/2006 | Smith et al. | 374/144 |
| 7,260,501 B2 * | 8/2007 | Pattipatti et al. | 702/183 |
| 7,305,299 B2 * | 12/2007 | Yasui et al. | 701/109 |
| 7,418,816 B2 * | 9/2008 | Upadhyay et al. | 60/285 |
| 7,467,628 B2 * | 12/2008 | Adams et al. | 123/697 |
| 7,891,177 B2 * | 2/2011 | Ammineni et al. | 60/297 |
| 2005/0252497 A1 | 11/2005 | Yasui et al. | |
| 2007/0089501 A1 * | 4/2007 | Endicott | 73/118.1 |
| 2007/0295924 A1 * | 12/2007 | Clausen | 251/129.04 |
| 2008/0151964 A1 * | 6/2008 | Hagen et al. | 374/152 |

OTHER PUBLICATIONS

Chang,SK;General-Structured Unknown Input Observers; Proc. American Control Conf; Jun. 1994; WM10-3:10; Baltimore, MD.

(Continued)

*Primary Examiner* — Gail Verbitsky

(57) ABSTRACT

An internal combustion engine includes an exhaust gas feedstream flowing past a gas sensing device disposed therein. The gas sensor includes an integrated electrical heating element which provides a resistance indicative of its temperature. An unknown input observer is used to determine the exhaust gas feedstream temperature based on the heating element temperature.

15 Claims, 3 Drawing Sheets

OTHER PUBLICATIONS

Hou,M.; Design of Observers for Linear Systems with Unknown Inputs; IEEE Trans. on Automatic Control; Jun. 1992; vol. 37, No. 6; pp. 871-875.

Krzeminski,S.; Perfect Reduced-Order Unknown-Input Observer for Standard Systems; Bull. Polish Academy of Sciences; 2004; vol. 52(2); pp. 103-107; Poland.

* cited by examiner

METHOD AND APPARATUS FOR DETERMINING TEMPERATURE IN A GAS FEEDSTREAM

CROSS REFERENCE TO RELATED APPLICATIONS

This application is a divisional of application Ser. No. 11/853,074, filed Sep. 11, 2007, the contents of which are incorporated by reference.

TECHNICAL FIELD

This disclosure is related to monitoring temperature in a gas feedstream.

BACKGROUND

Modern vehicles require exhaust aftertreatment systems and engine control to achieve emissions levels to comply with various regulations. It is known that aftertreatment systems operate most efficiently under controlled conditions, including operating within appropriate temperature windows. It is desirable to have information regarding an exhaust gas feedstream, including air/fuel ratio and temperature, at multiple locations in an aftertreatment system which is equipped with multiple reactors, catalysts or other emission abatement devices. It is known that engine systems employing lean $NO_x$ trap devices (LNT) operate most effectively to trap and regenerate when the LNT is maintained within a narrow range of operating temperatures. It is known that diesel particulate filters (DPF) and selective catalyst reduction systems operate most effectively within a narrow range of operating temperatures.

Known engine control systems utilize one or more gas sensing devices to monitor the exhaust gas feedstream for feedback to the engine system for emissions control and diagnostics. Known gas sensing devices include conventional oxygen sensors, wide-range air/fuel ratio sensors, and exhaust gas constituent sensors, e.g., NOx sensors. A gas sensing device includes a sensing element and an electrically-powered integral heating element. The heating element is used to rapidly heat up and maintain operating temperature of the sensing element within an optimum range of operational temperatures. The sensing element is adapted to monitor oxygen concentration, air/fuel ratio, or other exhaust gas constituents. Known internal combustion engines use one or more gas sensing devices to monitor gases in an exhaust system, an exhaust gas recirculation (EGR) system, and an intake manifold, such as described.

Information regarding the temperature of the exhaust gas feedstream is useful for controlling operation of the engine system to achieve emissions targets, since the effectiveness of a device that treats exhaust gases is dependent upon the operating temperature of the device and the feedstream temperature. A known system for determining the exhaust gas feedstream temperature includes employing a temperature sensor to monitor temperature at a specific location, with the sensor signal output to an electronic control module which controls engine operation. Such a system adds cost, while providing accuracy associated with direct measurement of temperature. Another known system for determining temperature of the exhaust gas feedstream includes algorithms to estimate temperature based upon engine operating conditions and information from existing sensing devices. Such a system incurs limited cost to the system, but requires investment of engineering resources to develop the algorithms and calibration. Furthermore, accuracy of the temperature estimation is known to vary.

SUMMARY

A gas feedstream temperature is measured by providing a gas sensing device including an integrated heating element disposed within the gas feedstream. Electrical resistance of the integrated heating element is measured and temperature of the integrated heating element based upon the measured electrical resistance is determined. A gas temperature proximal to the sensing device is determined based upon the temperature of the integrated heating element. And, the gas feedstream temperature is determined based upon the gas temperature proximal to the sensing device.

BRIEF DESCRIPTION OF THE DRAWINGS

One or more embodiments will now be described, by way of example, with reference to the accompanying drawings, in which.

DETAILED DESCRIPTION

Figure 1:
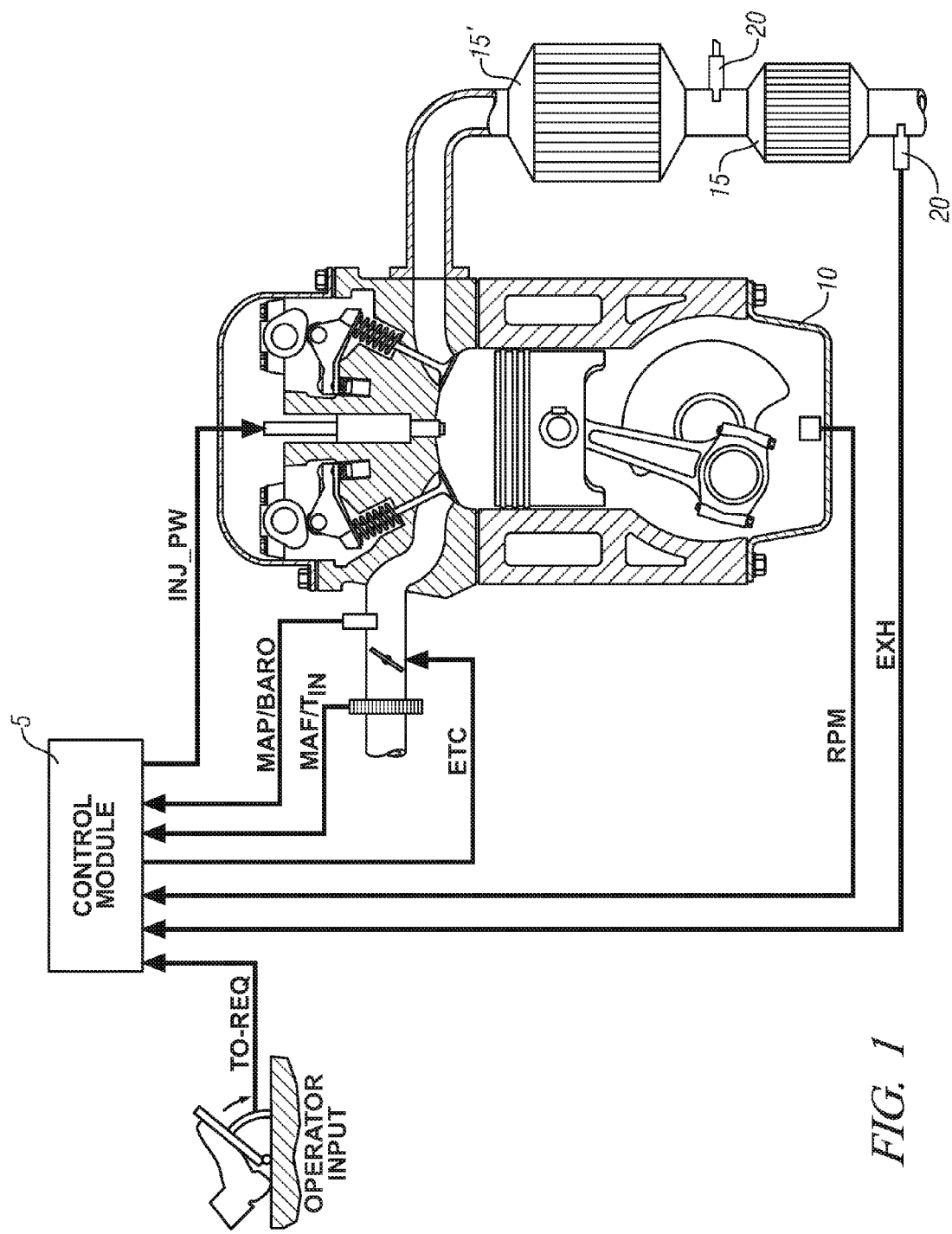
FIG. 1 is a schematic diagram of an exemplary engine and exhaust aftertreatment system in accordance with the present disclosure.

Referring now to the drawings, wherein the showings are for the purpose of illustrating certain exemplary embodiments only and not for the purpose of limiting the same, FIG. 1 comprises a schematic diagram depicting an internal combustion engine 10, exhaust aftertreatment system, and control module 5 which are in accordance with an embodiment of the disclosure.

The engine 10 comprises a direct-injection internal combustion engine. The skilled practitioner understands that the disclosure applies to a multiplicity of engine configurations. During ongoing engine operation, combustion events occur during engine cycles when fuel is injected into combustion chambers and ignited. In-cylinder burned gases are generated which become exhaust gases when passed out of the combustion chamber with opening of engine exhaust valves.

The exhaust gas feedstream is characterized by parameters including mass flowrate, temperature, air/fuel ratio, and by concentrations of various gas constituents, including waste products output from the combustion process of the internal combustion engine. The gas constituents can include unburned hydrocarbons, carbon monoxide, nitrides of oxygen, particulate matter, and other gases that are regulated by various federal or state emissions laws and regulations. The gas constituents also include other gases, e.g., oxygen and carbon dioxide. The characterization of the gas feedstream in terms of states of the aforementioned parameters and constituents is known.

The exhaust aftertreatment system comprises an integrated system for converting exhaust gas constituents. This comprises oxidizing unburned hydrocarbons and carbon monoxide to oxygen and carbon dioxide, reducing nitrides of oxygen to nitrogen and oxygen, and combusting the particulate matter to elemental carbon, among others. The exhaust aftertreatment system can be constructed of a plurality of devices which employ technologies having various capabilities for treating the exhaust gas constituents, including, e.g., three-way catalytic conversion, lean NOx adsorption and reduction, selective catalyst reduction, oxidation, and particulate filtering. The devices are preferably fluidly connected using pipes and connectors. An engine exhaust manifold entrains and directs exhaust gas flow to the exhaust aftertreatment system. The aftertreatment system as depicted comprises a first catalytic device 15' and a second catalytic device 15. Known catalytic devices comprise a metal housing device having a flow inlet and a flow outlet and containing a ceramic honeycomb-structure substrate impregnated with a platinum-group metal catalyst supported on an alumina washcoat, although the disclosure is not so limited.

The control module 5 comprises an electronic device adapted for use with the engine 10. The control module 5 is signally connected to sensing devices to monitor engine operation, and operably connected to actuators to control engine operation. The sensing devices are installed on or near the engine to monitor physical characteristics and generate signals which are correlatable to states of engine and ambient parameters. The sensing devices preferably comprise sensors including a crank sensor for monitoring crankshaft speed (RPM), a pressure sensor for monitoring intake manifold pressure (MAP) and ambient pressure (BARO), a mass air flow sensor for monitoring intake mass air flow (MAF) and intake air temperature ($T_{IN}$), and, one or more gas sensing devices 20 for monitoring states of one or more parameters of the exhaust gas feedstream, e.g., air/fuel ratio and exhaust gas constituents (EXH). The gas sensing devices 20 are selectively placed in the exhaust system before, in the middle of, and after the aftertreatment devices 15, 15' for feedback control and diagnostics of the engine, the exhaust gas feedstream and the aftertreatment devices. Alternatively, or in addition, gas sensing devices may be adapted to monitor gases in an EGR system (not shown), or the engine intake manifold.

Actuators are installed on the engine and in the aftertreatment system, and are controlled by the control module 5 in response to the operator inputs to achieve various performance goals. Actuators include, e.g., an electronically-controlled throttle device which controls throttle opening to a commanded input (ETC), and a fuel injector adapted to inject fuel into engine combustion chambers in response to a commanded input (INJ_PW), the EGR system, an ignition system to control spark-ignition on systems so equipped, and other systems controlled in response to operator input in the form of an operator torque request (TO-REQ).

The control module 5 monitors inputs from the sensing devices, synthesizes pertinent information, and executes algorithms to control various actuators to achieve control targets, including such parameters as fuel economy, emissions, performance, drivability, diagnostics, and protection of hardware. The control module is operably connected, either directly or through the control system, to a plurality of devices through which a vehicle operator controls or directs operation of the vehicle and powertrain. Exemplary devices through which the vehicle operator controls or directs the operation of the powertrain include the throttle and brake pedals, a transmission gear selector, and vehicle speed cruise control. The engine is preferably equipped with other sensors (not shown) for monitoring operation and system control. Each of the sensing devices is signally connected to the control module 5 to provide signal information which is transformed by the control module to information representative of a state one or more of the engine and ambient parameters. It is understood that this configuration is illustrative, not restrictive, including the various sensing devices being replaceable within functionally equivalent devices and algorithms which fall within the scope of the disclosure.

The control module 5 is preferably an element of a distributed control system comprising a plurality of control modules adapted to provide coordinated control of the various vehicle systems including the powertrain system described herein, when the engine is used in a vehicle. The control module 5 comprises a central processing unit signally electrically connected to volatile and non-volatile memory devices via data buses. The control module is preferably a general-purpose digital computer generally comprising a microprocessor or central processing unit, storage mediums comprising random access memory (RAM), non-volatile memory devices including read only memory (ROM) and electrically programmable read only memory (EPROM), high speed clock, analog to digital (A/D) and digital to analog (D/A) circuitry, and input/output circuitry and devices (I/O) and appropriate signal conditioning and buffer circuitry. Control algorithms, comprising resident program instructions and calibrations, are stored in the non-volatile memory devices and executed to provide the respective functions. Algorithms can be executed during preset loop cycles such that each algorithm is executed at least once each loop cycle. Algorithms are executed by one of the central processing units to monitor inputs from the sensing devices and execute control and diagnostic routines to control operation of the respective device. Loop cycles are executed at regular intervals, for example each 3.125, 6.25, 12.5, 25 and 100 milliseconds during ongoing engine and vehicle operation. Alternatively, algorithms may be executed in response to occurrence of an event.

Figure 2:
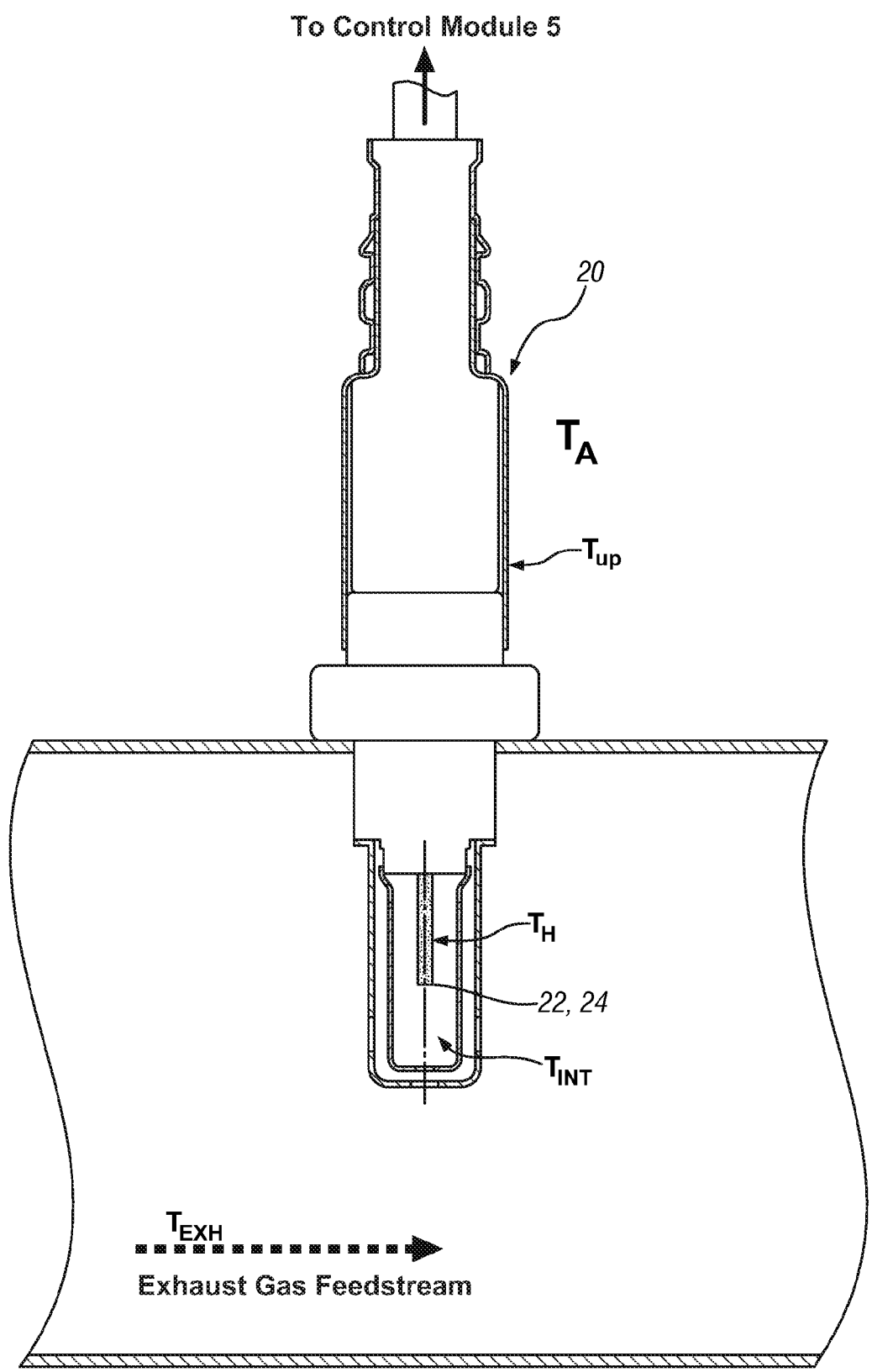
FIG. 2 is a partial sectional view of an exhaust gas sensing device in accordance with the present disclosure; and, FIG. 3 is a schematic view of an electrical circuit in accordance with the present disclosure.

FIG. 2 schematically depicts the gas sensing device 20, preferably comprising a planar-type heated sensing device, a portion of which is inserted into the exhaust gas feedstream. The gas sensing device 20 comprises a sensing element 22 and a controllable heating element 24 operably coupled to the control module 5. The output of the sensing element 22 is input to the control module 5 for signal processing and to determine a state of a parameter of the exhaust gas feedstream. The gas sensing device 20 as shown is mounted in an exhaust pipe of the exhaust system on a mounting structure that preferably comprises a threaded mounting boss or another device suitable for mounting. The sensing element 22 of the exemplary gas sensing device 20 comprises a zirconium oxide element operable to monitor a partial oxygen pressure of the exhaust gas feedstream. Alternatively, the sensing element 22 may comprise an element operable to monitor states of parameters of the gas feedstream, including constituent elements, e.g., nitrides of oxygen ($NO_x$), carbon dioxide ($CO_2$), carbon monoxide (CO), or hydrocarbons (HC). The heating element 24 comprises a known electrical resistive element or a positive temperature coefficient electrical resistive element, and is electrically connected to the control module via an electrical wiring harness, as depicted with reference to FIG. 3. There is a relationship between the resistance, $R_H$, and a temperature of the heating element 24, $T_H$, that is determined during development of the gas sensing device 20, is consistent from part to part, and can be calibrated during stasis periods using an on-system temperature, e.g., $T_{IN}$ from the intake air sensor. The temperature/resistance calibration is stored in one of the memory devices of the control module to control temperature of the heating element. FIG. 2 depicts locations of temperatures of interest for the disclosure, including: temperature of the exhaust gas feedstream, $T_{EXH}$; temperature of gases within a lower shield surrounding the sensing element, $T_{INT}$; temperature of the heating element 24, $T_H$; temperature of an upper shield surrounding the sensing element, $T_{up}$; and ambient temperature surrounding the upper shield, $T_A$.

Figure 3:
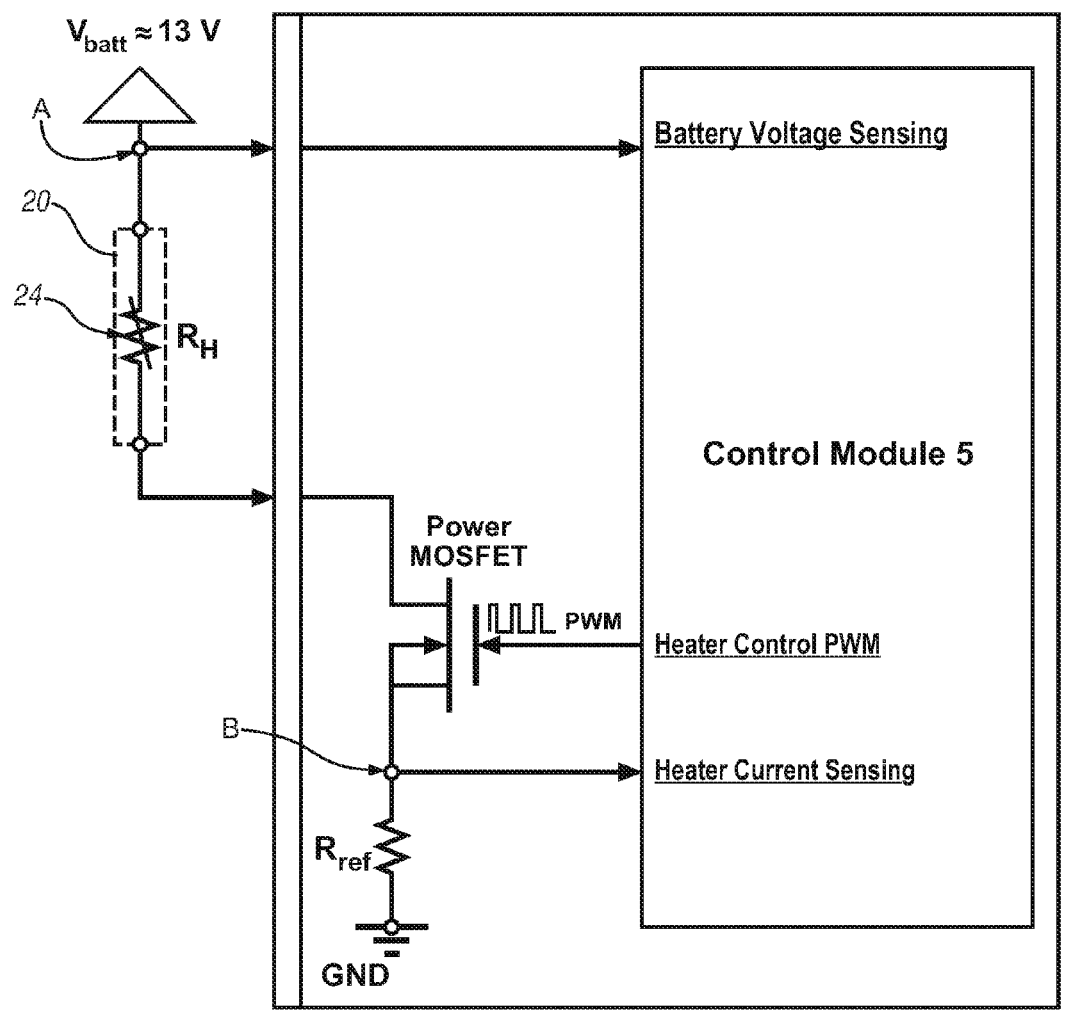

FIG. 3 depicts a schematic diagram of an exemplary circuit for controlling operation of the heating element 24. The circuit comprises the sensor 20 connected to the control module 5, including the heating element 24, a field-effect transistor (Power MOSFET), and a precision reference resistor, $R_{ref}$. The circuit further comprises a system voltage ($V_{batt}$) and ground (GND). The field-effect transistor is controlled by a pulsewidth modulated (PWM) signal output from control module 5 (Heater Control PWM). Node A denotes a specific juncture in the circuit at which control module 5 measures battery voltage (Battery Voltage Sensing) for analysis purposes. Node B denotes a specific juncture in the circuit at which control module 5 measures voltage for determining heater current (Heater Current Sensing). The control module 5 controls the amount of electrical power to the heating element 24 by controlling the PWM signal. The PWM signal is preferably a square wave signal that alternates between zero voltage and system voltage at a given frequency. The amount of power to the heating element 24 is determined by the frequency of the PWM signal and percentage of time during each cycle that the voltage level is at the system voltage, referred to as the duty cycle. The control module 5 determines the resistance of the heating element 24 by measuring voltages at Node A and Node B when the heating element is powered. The heating element resistance, $R_H$, is calculated based upon the voltages at Nodes A and B and the resistance of the reference resistor, $R_{ref}$, using a known voltage divider relationship.

A method is now described to estimate exhaust gas temperature, $T_{EXH}$, at a location in the exhaust aftertreatment system. The method preferably comprises executable code consisting of one or more algorithms stored and executed in the control module 5, and depicted in a non-limiting manner with the exhaust system of the exemplary engine illustrated and described herein. The exhaust gas temperature, $T_{EXH}$, is of interest for control schemes and systems related to managing the exhaust gas feedstream entering into or discharging from one of the exhaust aftertreatment devices, entering the EGR system, entering a turbocharger system, and others.

An unknown input observer (UIO) model is implemented as an algorithm in the control module 5. The UIO algorithm for this embodiment is developed and calibrated to regularly and ongoingly estimate exhaust gas temperature at a specific location in the exhaust aftertreatment system based upon the measured temperature of the heating element 24 of the gas sensing device 20. The UIO model comprises mathematically reconstructing a state of a dynamic system, e.g., the exhaust aftertreatment system, having inputs that are not directly or readily measurable.

A physical model of the system for describing a relationship between temperatures in the exhaust gas feedstream is provided with reference to Eqs. 1 and 2:

$$T_{INT}=f(T_{EXH}, T_A, \dot{m}_{TH}) \quad [1]$$

$$\dot{T}_H=pT_H+qV_{BATT}I_HDC+T_{INT} \quad [2]$$

wherein $T_{INT}$, $T_{EXH}$, $T_A$ and $V_{BATT}$ are as previously defined, and $\dot{m}_{TH}$ comprises mass air flow preferably measured by the MAF sensor, $I_H$ comprises current through the heater based upon the heater resistance $R_H$, DC comprises duty cycle of the PWM signal, and p and q comprise calibratable constants based upon a sampling rate. Thus, there is a relationship between exhaust gas temperatures inside the lower shield of the sensor, $T_{INT}$, and the exhaust gas temperature, $T_{EXH}$, which is affected by factors related to heat transfer through the shield, ambient and underhood temperatures, and mass airflow rate of the exhaust gas feedstream, and other factors related to heat transfer and the exhaust gas feedstream.

To develop a system executable in the control module, a discrete model of the relationship between exhaust gas temperatures is developed, using the following definitions:

$x(k)=T_H(k);$
$u(k)=V_{BATT}I_HDC;$
$v(k)=T_{INT}(k);$ and
$y(k)=T_H(k).$

A discrete space model of Eqs. 1 and 2 is defined as Eqs. 3 and 4:

$$x(k+1)=\alpha x(k)+\beta u(k)+\gamma v(k) \quad [3]$$

$$y(k)=x(k) \quad [4]$$

The model format of Eqs. 3 and 4 is rewritten into a standard format of Eq. 5, below:

$$x(k+1)=Ax(k)+Bu(k)+Dv(k)$$

$$y(k)=Cx(k) \quad [5]$$

A linear system theory is applied to the above linear model of Eq. 5. In this estimation application, C=1 and, therefore $y(k)=x(k)$.

A general UIO model based upon the above system comprises a linear system having an unknown input, $v(k)$, at time period k, modeled as a linear function, as in Eq. 6 and 7:

$$\hat{x}(k+1)=(\alpha-L_1\alpha-L_2)\hat{x}(k)+(\beta-L_1\beta)u(k)+L_1y(k)+L_2y(k+1) \quad [6]$$

$$\hat{v}(k+1)=\gamma(y(k+1)-\alpha\hat{x}(k)-\beta u(k)) \quad [7]$$

The term $\hat{x}(k)$ comprises an estimate of the true state $x(k)$. Terms $L_1$ and $L_2$ are design parameters calibrated based upon the desired performance for the estimation response. The terms $\alpha$, $\beta$, and $\gamma$ are preferably determined for a specific system during preproduction testing and calibration, and may be updated during ongoing operation. The term $\hat{x}(k)$ can be considered as a filtered version of $x(k)$ that is based upon a noisy measure of $y(k)$.

Thus, using the UIO estimation, i.e., Eqs. 6 and 7, the internal temperature, $T_{INT}(k)=v(k)$, is estimated during ongoing operation based upon the heater temperature, $T_H$. The internal temperature $T_{INT}(k)$ is used to determine the exhaust gas temperature, $T_{EXH}(k)$, based upon other engine variables. An inverse function of Eq. 1, above, i.e., $f^{-1}(T_{INT})$, is calculated, as in Eq. 8:

$$T_{EXH}=f^{-1}(T_{INT}, T_A, \dot{m}_{th}) \quad [8]$$

An estimated exhaust temperature can be obtained via Eq. 9, based upon Eqs. 6, 7 and 8:

$$\hat{T}_{EXH}=f^{-1}(\hat{T}_{INT}, T_A, \dot{m}_{th}) \quad [9]$$

Thus, for the calibrated system, the control module ongoingly executes the algorithms to estimate the gas temperature at the predetermined location based upon the observed temperature of the heater for the exhaust gas sensing device.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for measuring a gas feedstream temperature, comprising:
   providing a gas sensing device including an integrated heating element and surrounded by a lower shield filled with the gas, the sensing device disposed within the gas feedstream;
   measuring electrical resistance of the integrated heating element;
   determining temperature of the integrated heating element based upon the measured electrical resistance;
   executing an unknown input observer model to estimate a gas temperature within the lower shield surrounding the sensing device based upon the temperature of the integrated heating element; and,
   determining the gas feedstream temperature based upon the estimated gas temperature within the lower shield surrounding the sensing device.

2. The method of claim 1, wherein the unknown input observer model comprises a linear model.

3. The method of claim 1, wherein the gas feedstream comprises post-combustion process exhaust gases.

4. The method of claim 3, wherein the post-combustion process exhaust gases comprise exhaust gases from an internal combustion engine.

5. Control system for monitoring an exhaust gas feedstream, comprising:
   a sensing device having an integrated heating element and surrounded by a lower shield filled with the gas;
   a control module monitoring an electrical resistance of the integrated heating element, determining a temperature of the integrated heating element based upon the electrical resistance, using an unknown input observer model to estimate a gas temperature within the lower shield surrounding the sensing device based upon the temperature of the integrated heating element, and determining a temperature of the gas feedstream based upon the gas temperature within the lower shield surrounding the sensing device.

6. The control system of claim 5, wherein the unknown input observer model comprises a linear model.

7. The control system of claim 5, wherein the control module determining a temperature of the gas feedstream based upon the gas temperature within the lower shield surrounding the sensing device comprises the control module determining temperature of the gas feedstream at a predetermined location based upon the gas temperature within the lower shield surrounding the sensing device.

8. The control system of claim 5, wherein the sensing device having an integrated heating element comprises a planar-type exhaust gas sensing device.

9. The control system of claim 5, wherein the sensing device is configured to monitor a partial pressure of oxygen.

10. The control system of claim 5, wherein the sensing device is configured to monitor a gas constituent.

11. The control system of claim 5, wherein the sensing device is configured to monitor nitrides of oxygen.

12. Control system for monitoring an exhaust gas feedstream within an exhaust gas aftertreatment system, comprising:
    an integrated heating element of a sensing device adapted to monitor the exhaust gas feedstream the sensing device is surrounded by a lower shield filled with the gas;
    a control module monitoring electrical resistance of the integrated heating element of the sensing device, determining a temperature of the integrated heating element based upon the electrical resistance, estimating a gas temperature within the lower shield surrounding the sensing device based upon the temperature of the integrated heating element using an unknown input observer model, and determining a temperature of the exhaust gas feedstream based upon the estimated gas temperature within the lower shield surrounding the sensing device.

13. The control system of claim 12, wherein the sensing device having an integrated heating element comprises a planar-type exhaust gas sensing device.

14. The control system of claim 13, wherein the sensing device monitors a partial pressure of oxygen.

15. The control system of claim 13, wherein the sensing device monitors nitrides of oxygen.

* * * * *